J. P. BALDWIN.
FRICTION ELEMENT AND METHOD OF MAKING THE SAME.
APPLICATION FILED MAY 19, 1919.
1,438,572.
Patented Dec. 12, 1922.
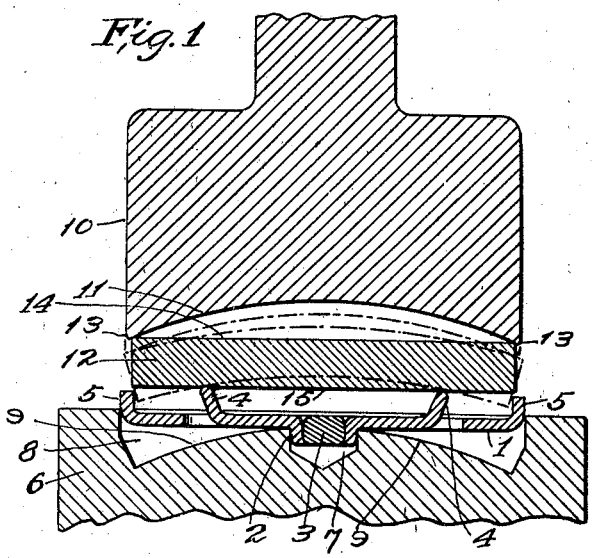
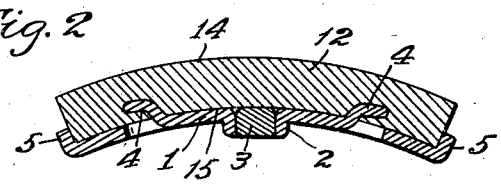
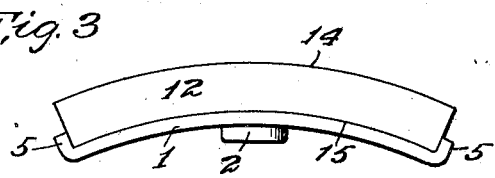
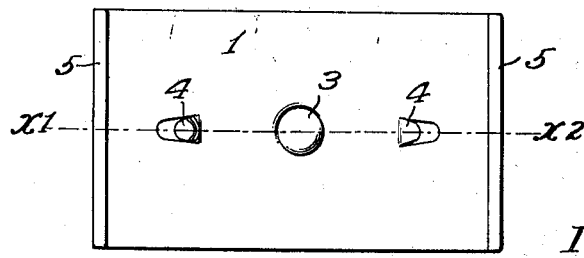
Witness
C. C. Holly.
Inventor
James Pierce Baldwin
by
James R. Townsend.

Patented Dec. 12, 1922.

1,438,572

UNITED STATES PATENT OFFICE.

JAMES PIERCE BALDWIN, OF LOS ANGELES, CALIFORNIA.

FRICTION ELEMENT AND METHOD OF MAKING THE SAME.

Application filed May 19, 1919. Serial No. 298,345.

*To all whom it may concern:*

Be it known that I, JAMES PIERCE BALDWIN, a citizen of the United States, residing at Los Angeles, in the county of Los Angeles and State of California, have discovered and invented a new and useful Friction Element and Method of Making the Same, of which the following is a specification.

This invention relates more particularly to friction elements for use in shock absorbers having parts that have relative oscillatory or rotatory movement, although parts of the invention may be applicable to other purposes.

An object of the invention is to provide a frictional element which, when in contact with a metal element, as steel, will have a frictional co-efficient increasing proportionally to increased velocity, so that in case of shock absorbers the greater shocks are resisted by greater friction, and vice versa.

After a little use, the frictional surfaces become highly polished; and a problem to solve with respect to shock absorbers, is the tendency of the polished frictional surfaces to slide upon each other more easily as the velocity with which they are reversely driven is increased; and an object of this invention is to obtain an effect, opposite to that which is unavoidable by means heretofore known; so that when the velocity of the recoil of the springs is high, it will meet a greater resistance than when said velocity is low, thus tending to more efficient operation upon roads of varying roughness, and with varying vehicle speeds, than has heretofore been possible to attain.

It is necessary to keep the frictional surfaces of shock absorbers well lubricated in order to avoid chattering and squeaking, and to prevent destructive wear; and without lubrication, the highly polished metal frictional surfaces rust when out of use for a short period.

I have experimented with many materials in various types of shock absorbers, with the object of finding some suitable material which would have a frictional co-efficient increasing with velocity, and adapted to suitable lubrication. There are a number of brake linings in which the frictional co-efficient increases with velocity; but all such brake linings have been unfit for use in shock absorbers, owing to the physical characteristics of such linings, and to the fact that under use of lubricants therewith, they are likely to become gummy, and invariably soften and compress rapidly, thus getting out of operative adjustment.

After much experimentation through a period of over eight years with an object of solving the problem above indicated, I have discovered that the solution thereof, is reached through constructing a frictional surface for use in frictional contact with polished steel, by machining off so much of the natural surface of the hair side of hard sole leather as is necessary to free said side from the glossy surface of its usual finish, and thus providing a dense fibrous surface backed by a tough, hard, solid body.

In preparing this material for use in shock absorbers of the type specified, I first machine off the natural surface of the sole leather on the flesh side to make a perfectly flat surface. I then reverse the leather and machine off the natural surface of the hair side of the leather to a depth of 10 to 15 one-thousandths of an inch, and make the piece of leather of uniform thickness throughout. It is thus seen that I provide a hard sole leather facing the friction face of which has its natural surface removed therefrom.

When the hair side has been thus treated it has a roughened unfinished appearance, but presents a close fibrous surface, which takes lubricants freely, and when moved in forcible contact with a smooth steel surface will exert a frictional resistance, depending upon the force by which the surfaces are pressed together, and also depending measurably upon the velocity with which the frictional surfaces are relatively moved on each other, the frictional co-efficient increasing as the velocity of such movement increases.

By experimentation in actual use with specimens of frictional surfaces thus constructed and applied in shock absorbers which were subject to severe usage on an automobile throughout 8,000 miles of travel. it was found that compression occurred to an extent of 6 one-thousandths of an inch in the first 274 miles of the run, after which there was no further change, either by compression or wear in the thickness of the leather, throughout the remainder of the 8,000 miles, and the friction under any predetermined speed was practically uniform in all instances.

In all my experiments I have never been able to find any other material which approaches the satisfactory results, above stated. All well known forms of brake linings, and all other materials adapted for brake linings, which I have employed, have been subject to the objections and difficulties above stated.

It is important that the frictional surfaces of the shock absorber shall be maintained in place in the shock absorber in the form of individual shoes that act upon the metal surfaces at spaced intervals, and in my application Serial No. 246,408, for sliding clutch, filed July 22, 1918, I have shown a form of shoe which, when supplied with this material, is adapted to effect the satisfactory results herein named, and I will now disclose the construction of a satisfactory friction element for such shoe and the method of making the same.

My newly invented shock absorber shoe is constructed with a metal back fixed to the prepared friction facing, and an object of this invention is to produce in a cheap and effective manner, a uniform practically non-destructable shoe having the requisite frictional surface.

Other objects, advantages and features of invention may appear from the accompanying drawings, the subjoined detailed description and the appended claims.

The invention will be understood by reference to the accompanying drawing.

Figure 1 is a sectional view of a die and punch adapted to complete the frictional element; the three pieces which preferably go to make up said element, being also shown in section on line indicated by $x^1$—$x^2$, Fig. 4. An intermediate position of the punch and leather is indicated in broken lines.

Fig. 2 is a longitudinal mid-section of the completed frictional element for a shock absorber shoe.

Fig. 3 is an edge elevation of the completed friction element.

Fig. 4 is a plan of the metal backing shown in Fig. 1.

The metal backing 1 is constructed of sheet metal suitable for punching and drawing, and the same is punched and drawn to form on its back, a central collar 2, adapted to hold a metal filling 3, which exactly fits the same and is riveted therein by crimping over the end of the collar 2. The purpose of this is to provide the metal sheet backing with a practically solid stud by which it may be secured in place on the shoe it is to back.

Tangs 4 and end walls 5 are struck up from the front face of the sheet 1, thus producing the stamping shown in Figs. 1 and 4. said stamping is then placed back down in a die 6, having a seat 7 for the stud formed by the collar 2. Said die 6 has a matrix 8 formed with a convex bottom 9 in parallelism with a surface conformed to the curvature of the surface, the friction face is to engage. The punch 10 has a concave face 11 conformed to the surface the friction element is to engage. The sole leather, piece, sheet or block 12, constructed as above outlined, is then brought into position as indicated in Fig. 1.

The tangs 4 of the finished backing extend upwardly and incline slightly toward the end walls 5 so that they will enter the sole leather block or facing 12 when the same is pressed down sufficiently to bend said leather facing and the metallic backing therefor into the form of an arc as shown in Figs. 2 and 3.

The ends 13 of the punch engage the ends of the leather and press them into the space inside the end walls as indicated in broken lines in Fig. 1 before the intermediate portion of the leather is forced down and before the metal backing is bent. As the punch advances and finally bends the sheet and seats the leather, the tangs 4 are bent downward and toward the end walls, thus positively retaining the sole leather sheets in place.

The leather sheet out of which the facing is to be formed is machine surfaced as at 14, 15 to remove the natural surfaces therefrom and to form faces of exact parallelism and be done by any suitable means, as by a planer, an emery wheel or other suitable grinding, cutting or abrading device capable of removing a slight superficial portion of the sole leather sheet.

I claim—

1. A frictional member for a shock absorber, comprising a metal back provided with end walls and tangs extending from one side and with a stud extending from the other side and a hard sole leather facing having its natural surface removed from the friction face thereof.

2. An element for a frictional device, comprising a block of sole leather having its natural surface removed from the friction face thereof, and a backing for the other side.

3. An element for a frictional device, comprising a block of sole leather having its natural surface removed from the friction face thereof, and bent into the form of an arc, and a backing for the other side.

4. An element for a frictional device, comprising a block of sole leather having its natural surface removed from the friction face thereof, and bent into the form of an arc, and a sheet metal backing conformed to and supporting the same.

5. An element for a frictional device, comprising a block of sole leather having its natural surface removed from the friction face thereof, and bent into the form of an arc, and a sheet metal backing conformed to and supporting the same, and provided with a collar and a reinforcing plug riveted therein.

6. An element for a frictional device, comprising a block of sole leather having its natural surface removed from one side thereof, and means to hold said side in position to engage a friction surface.

7. An element for a frictional device, comprising a block of sole leather having its natural surfaces removed and bent to form an arc and the means for holding one of said sides in contact with frictional means.

8. The frictional element set forth consisting of a piece of hard sole leather remaining after removal of the surface of the flesh side and about 10 to 15 one-thousandths of an inch of the hair side; so that the frictional element on the side opposite the flesh side of the piece presents a close fibrous surface which has a roughened unfinished appearance, and which takes lubricants freely, and which, when moved in forcible contact with a smooth steel surface will exert a frictional resistance, depending upon the force by which the surfaces are pressed together, and also depending measurably upon the velocity with which the frictional surfaces are relatively moved on each other, the frictional co-efficient increasing as the velocity of such movement increases.

9. The frictional element set forth consisting of a piece of hard sole leather remaining after removal of the natural surface of the hair side and having on the side opposite the flesh side of the piece, a close fibrous surface which has a roughened unfinished appearance, and which takes lubricants freely, and which, when moved in forcible contact with a smooth steel surface will exert a frictional resistance, depending upon the force by which the surfaces are pressed together, and also depending measurably upon the velocity with which the frictional surfaces are relatively moved on each other, the frictional co-efficient increasing as the velocity of such movement increases.

10. An element for a frictional device, comprising a block of sole leather having the natural surface removed from its hair side.

11. An element for a frictional device, comprising a block of sole leather having its natural surfaces removed, and bent into the form of an arc.

12. A friction element for a shock absorber comprising a block of sole leather having the natural surfaces removed from its faces.

In testimony whereof, I have hereunto set my hand at Los Angeles, California, this 13th day of May 1919.

JAMES PIERCE BALDWIN.

Witness:
M. BEULAH TOWNSEND.